Figure 1:
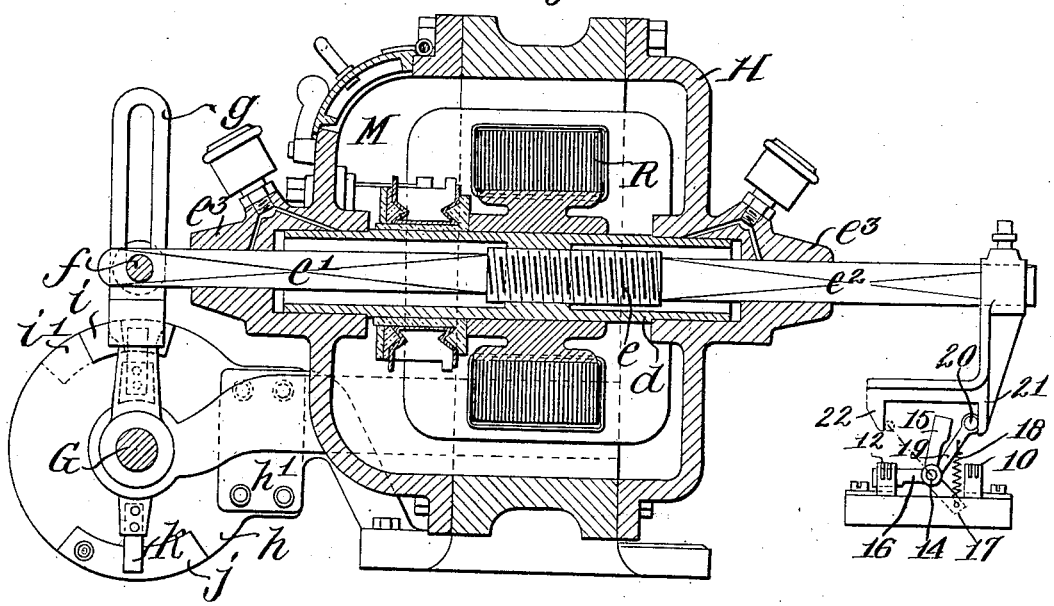

No. 763,921. PATENTED JUNE 28, 1904.
A. OESTERREICHER.
ELECTRICALLY CONTROLLED AUTOMATIC BLOCK SYSTEM FOR OPERATING RAILWAY SIGNALS.
APPLICATION FILED OCT. 4, 1902.

NO MODEL. 11 SHEETS—SHEET 1.

Witnesses:

Inventor
Alfred Oesterreicher
By James L. Norris
Atty.

No. 763,921. PATENTED JUNE 28, 1904.
A. OESTERREICHER.
ELECTRICALLY CONTROLLED AUTOMATIC BLOCK SYSTEM FOR OPERATING RAILWAY SIGNALS.
APPLICATION FILED OCT. 4, 1902.
NO MODEL. 11 SHEETS—SHEET 2.

Witnesses:

Inventor
Alfred Oesterreicher
By James L. Norris.
Atty.

No. 763,921. PATENTED JUNE 28, 1904.
A. OESTERREICHER.
ELECTRICALLY CONTROLLED AUTOMATIC BLOCK SYSTEM FOR OPERATING RAILWAY SIGNALS.
APPLICATION FILED OCT. 4, 1902.
NO MODEL. 11 SHEETS—SHEET 3.

Witnesses: Inventor
Alfred Oesterreicher
By James L. Norris
Atty.

No. 763,921. PATENTED JUNE 28, 1904.
A. OESTERREICHER.
ELECTRICALLY CONTROLLED AUTOMATIC BLOCK SYSTEM FOR OPERATING RAILWAY SIGNALS.
APPLICATION FILED OCT. 4, 1902.
NO MODEL.
11 SHEETS—SHEET 5.
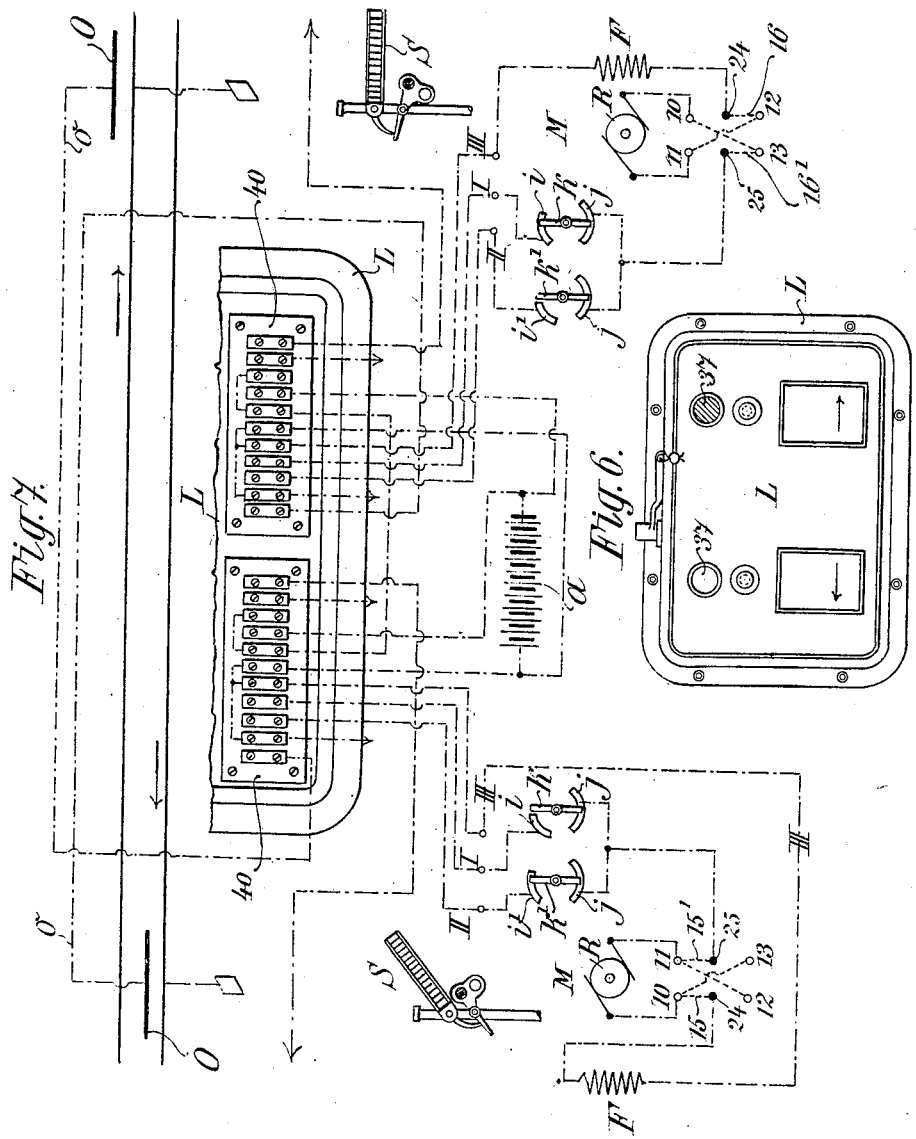

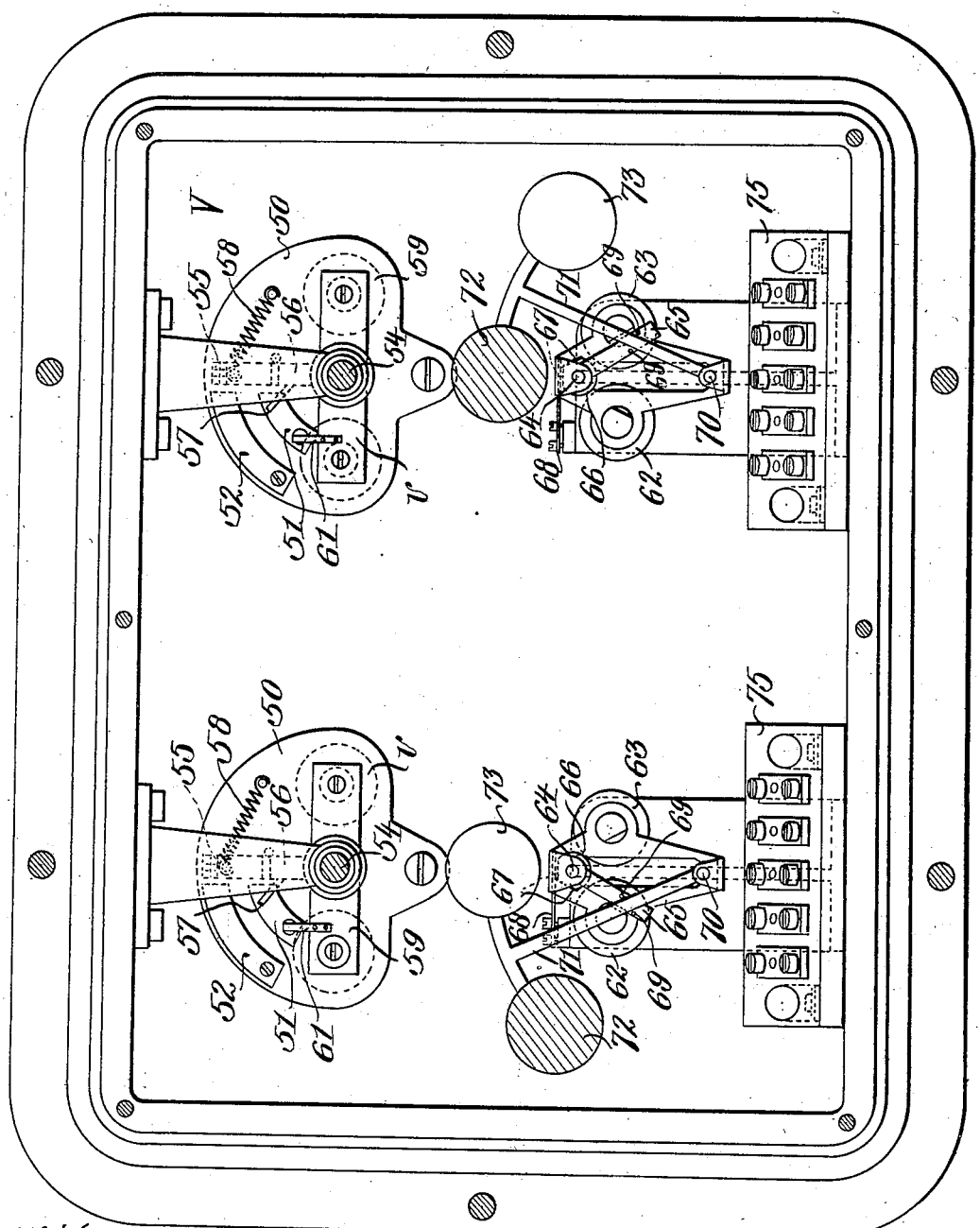

No. 763,921. PATENTED JUNE 28, 1904.
A. OESTERREICHER.
ELECTRICALLY CONTROLLED AUTOMATIC BLOCK SYSTEM FOR OPERATING RAILWAY SIGNALS.
APPLICATION FILED OCT. 4, 1902.
NO MODEL.
11 SHEETS—SHEET 7.
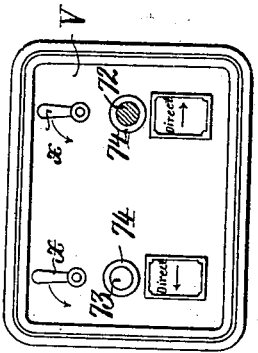
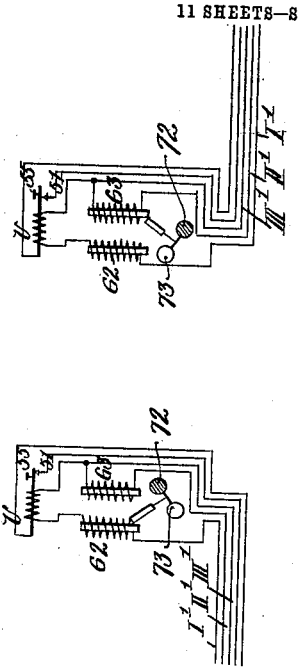

No. 763,921. PATENTED JUNE 28, 1904.
A. OESTERREICHER.
ELECTRICALLY CONTROLLED AUTOMATIC BLOCK SYSTEM FOR OPERATING RAILWAY SIGNALS.
APPLICATION FILED OCT. 4, 1902.
NO MODEL. 11 SHEETS—SHEET 8.
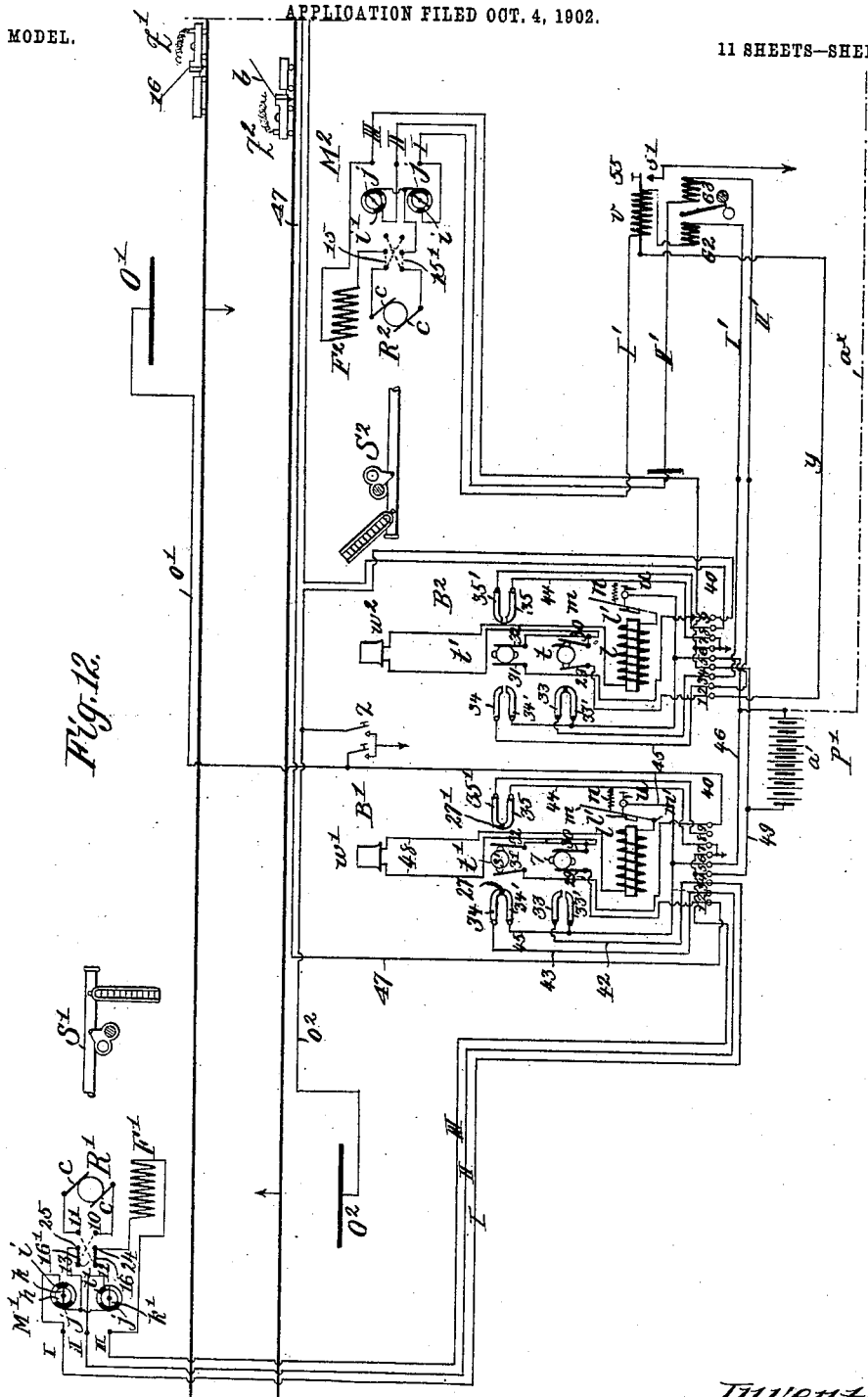

No. 763,921. PATENTED JUNE 28, 1904.
A. OESTERREICHER.
ELECTRICALLY CONTROLLED AUTOMATIC BLOCK SYSTEM FOR OPERATING RAILWAY SIGNALS.
APPLICATION FILED OCT. 4, 1902.
NO MODEL. 11 SHEETS—SHEET 9.
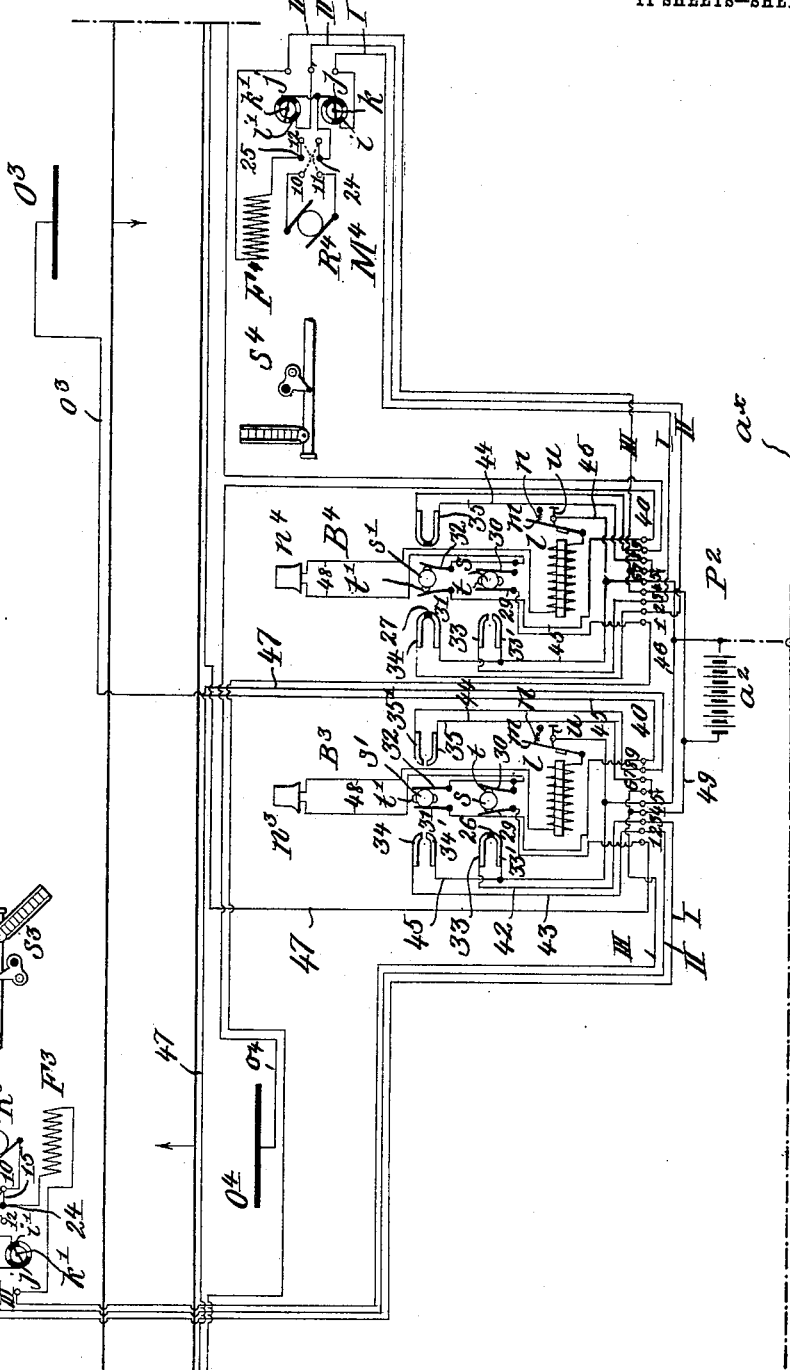
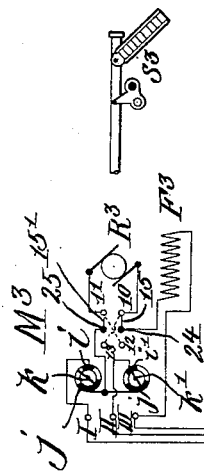

No. 763,921. PATENTED JUNE 28, 1904.
A. OESTERREICHER.
ELECTRICALLY CONTROLLED AUTOMATIC BLOCK SYSTEM FOR OPERATING RAILWAY SIGNALS.
APPLICATION FILED OCT. 4, 1902.
NO MODEL. 11 SHEETS—SHEET 10.
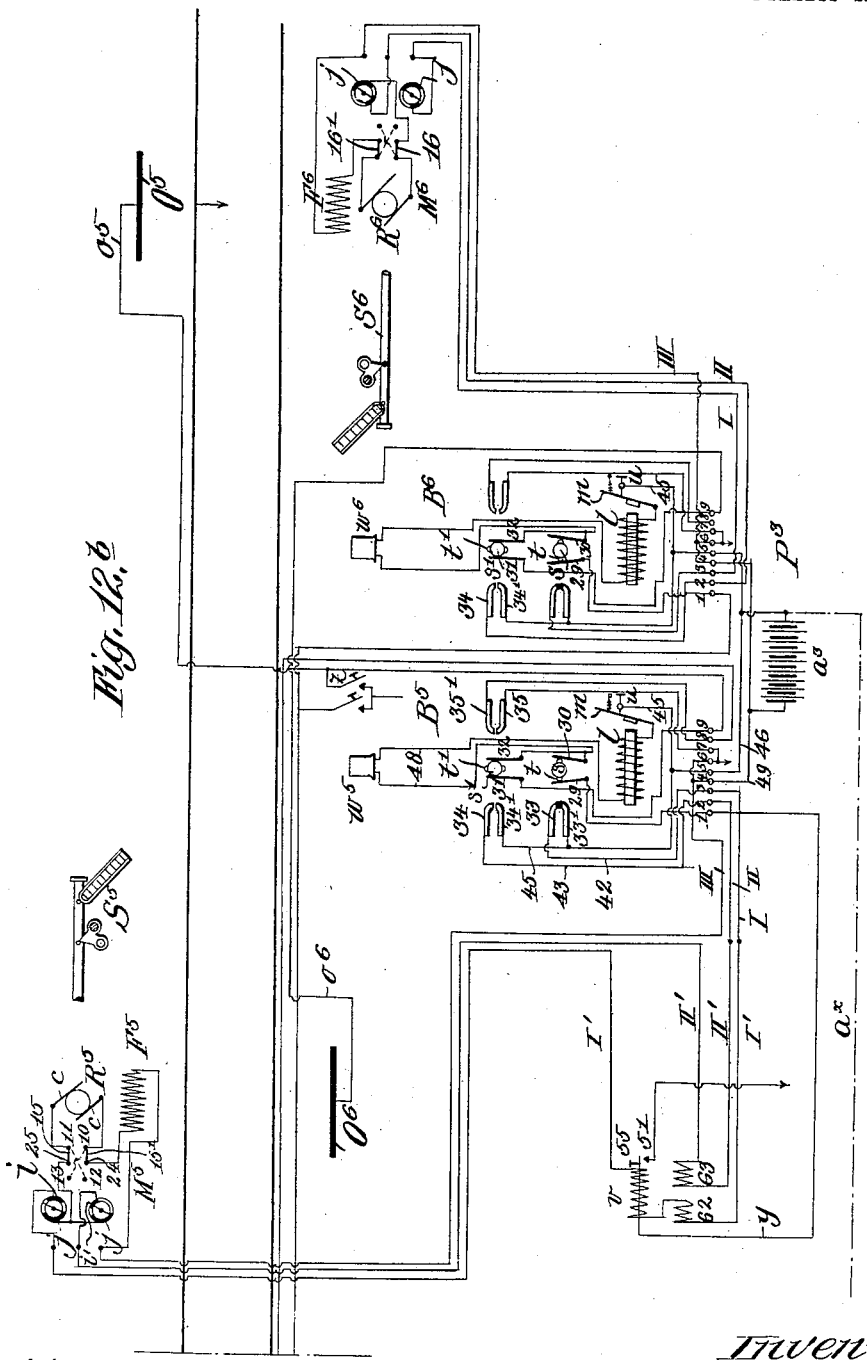
Witnesses:
Inventor
Alfred Oesterreicher
By James L. Norris,
Atty.

No. 763,921. PATENTED JUNE 28, 1904.
A. OESTERREICHER.
ELECTRICALLY CONTROLLED AUTOMATIC BLOCK SYSTEM FOR OPERATING RAILWAY SIGNALS.
APPLICATION FILED OCT. 4, 1902.
NO MODEL. 11 SHEETS—SHEET 11.
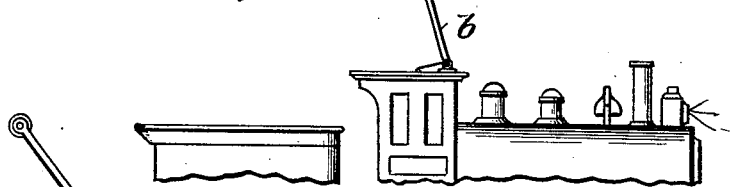
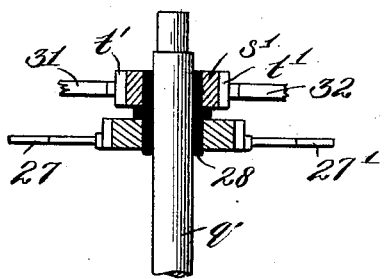
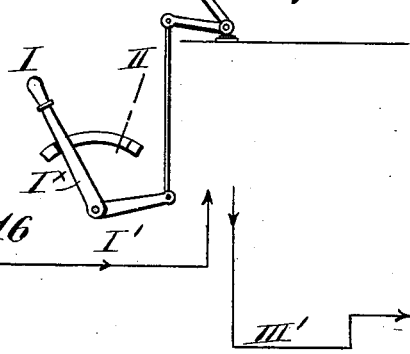
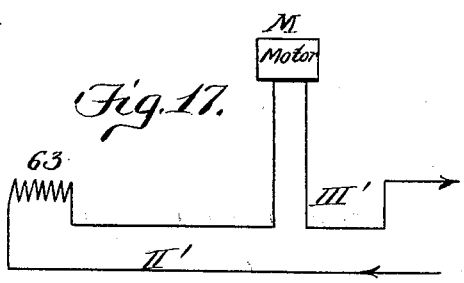
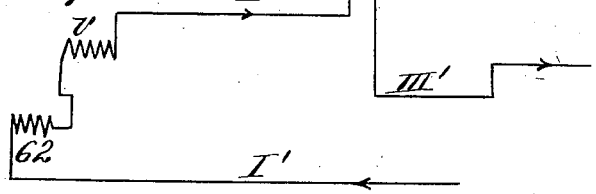
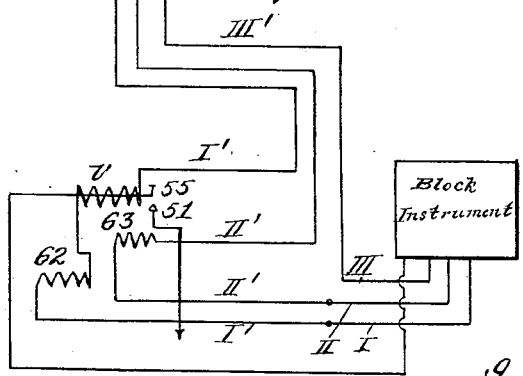
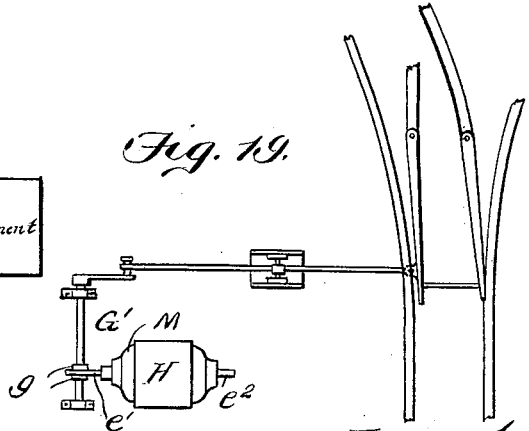
Witnesses:
C. D. Kesler
James L. Norris, Jr.
Inventor
Alfred Oesterreicher
By James L. Norris.
Atty.

No. 763,921. Patented June 28, 1904.

UNITED STATES PATENT OFFICE.

ALFRED OESTERREICHER, OF VIENNA, AUSTRIA-HUNGARY, ASSIGNOR OF ONE-HALF TO LORENZ NEMELKA, OF VIENNA XI, AUSTRIA-HUNGARY.

ELECTRICALLY-CONTROLLED AUTOMATIC BLOCK SYSTEM FOR OPERATING RAILWAY-SIGNALS.

SPECIFICATION forming part of Letters Patent No. 763,921, dated June 28, 1904.

Application filed October 4, 1902. Serial No. 125,961. (No model.)

*To all whom it may concern:*

Be it known that I, ALFRED OESTERREICHER, a subject of the Emperor of Austria-Hungary, residing at Vienna, in the Province of Lower Austria, in the Empire of Austria-Hungary, have invented certain new and useful Improvements in Electrically-Controlled Automatic Block Systems for Operating Railway-Signals; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to a block system of railway signaling intended to insure the safety of succeeding trains in which the setting of the signals or switches is generally effected in an automatic manner and in which the cost of installing and of working the whole system is considerably reduced owing to the reduction of the staff required to work it and to the simplification of the installation of conductors.

The automatic block-signaling system arranged according to this invention is characterized in that the current required for its working is established through short lengths of locally-arranged overhead line by means of a contact preferably arranged on the roof of the engine-driver's cab and positively operated from the starting-lever of the locomotive, said current passing through the electromotor controlling the position of the signals or of the switch-points of the section in which the train is traveling, the earth being utilized as a return. At the same time by means of a wire and of the earth-return a current is sent into the electromotor of the preceding section, so that the signals of the section in which the train is traveling become blocked and those on the preceding section placed at "all clear." The block instrument by means of which the train operates the signal-motors is connected by two wires alternately conveying the current and one common return-lead with the corresponding signal-motor, and the said instrument is in electrical connection with the similar block instrument of the preceding section and is, moreover, provided with a switching device operated by an automatic interrupter or circuit-breaker, which device when the movement of the motor is completed breaks the circuit through which the current is passing at that moment and closes the alternative circuit for operating the motor. The said signal-motor operates two switching devices, one of which stops the motor after the signals or the switch-points have been placed in position and the other switching device makes the connection required for the reverse motion of the motor, so that the position of the signal or of the points can be changed by the next train through the intermediary of the corresponding block instrument in circuit with the overhead line.

Figure 2:
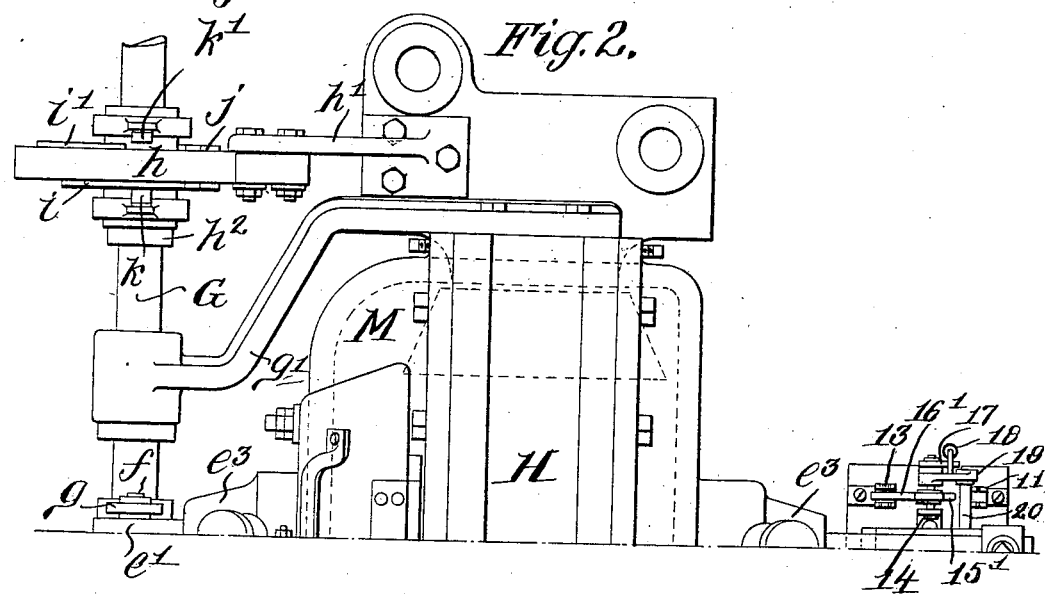
Figure 3:
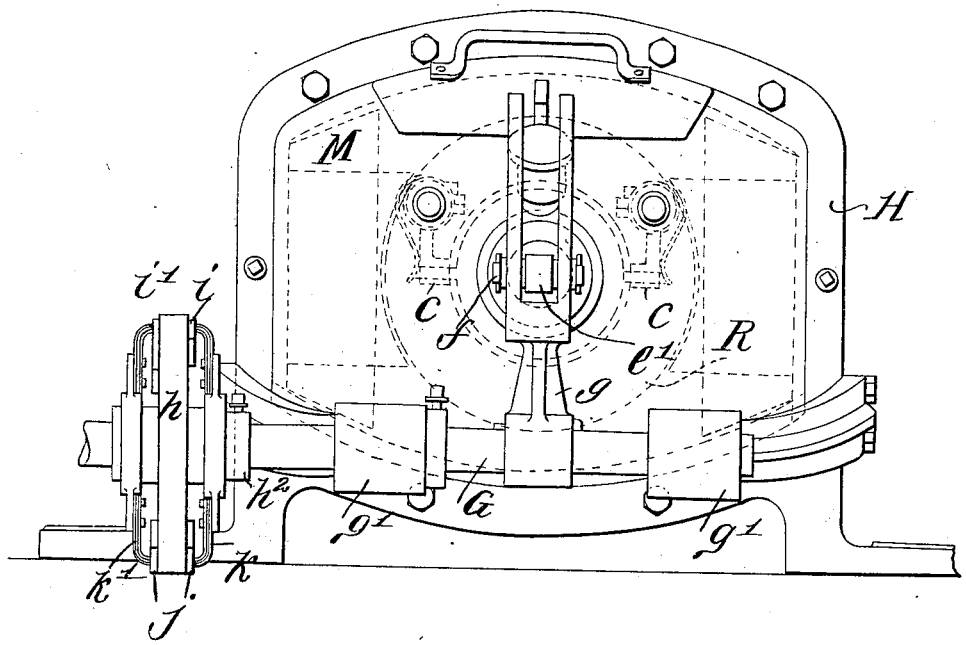
Figure 4:
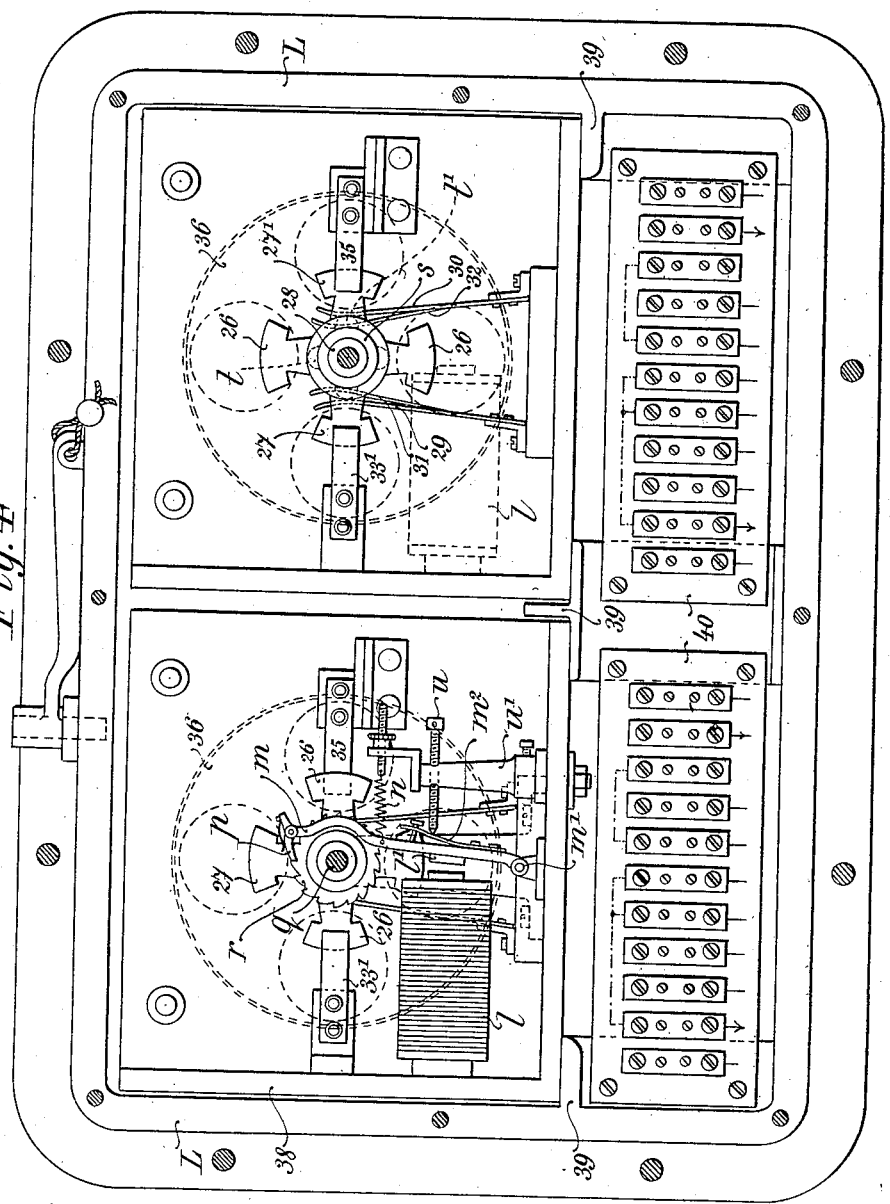
Figure 5:
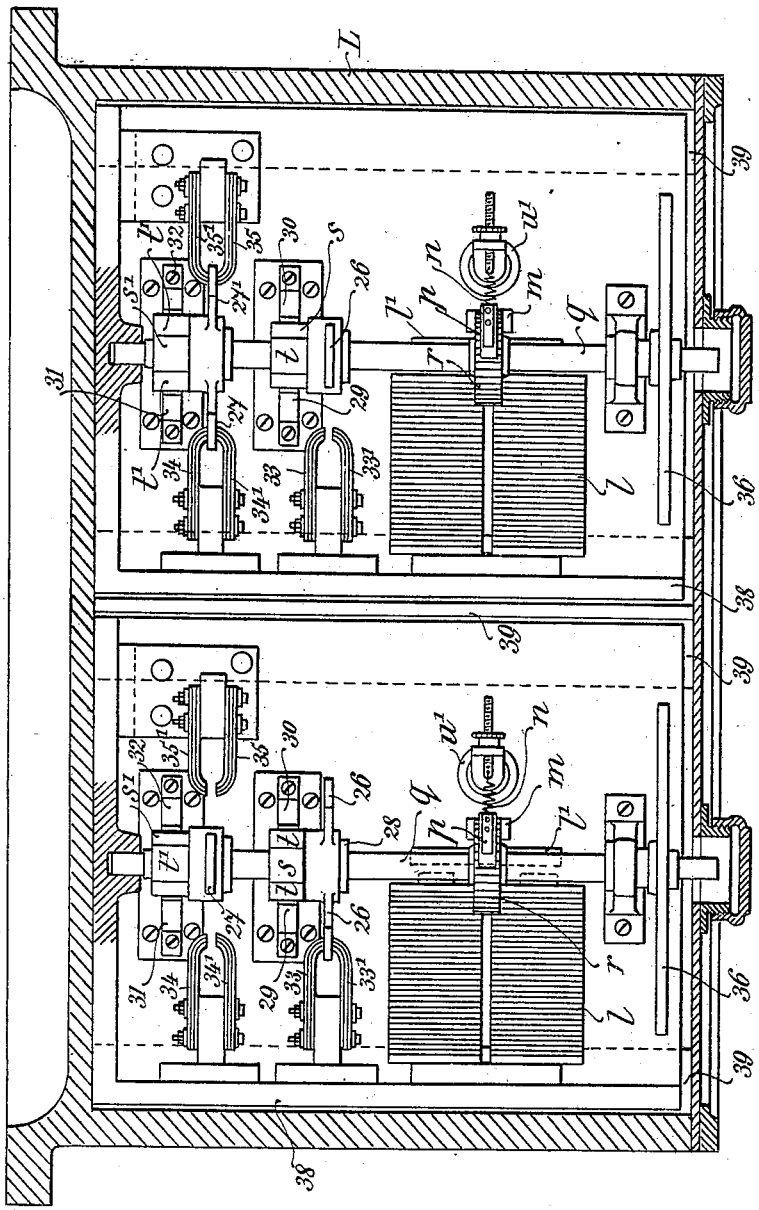

Figures 1, 2, and 3 illustrate a form of construction of the electromotor for working signals or switch-points, together with the circuit-changing devices operated thereby, in longitudinal vertical cross-section, plan, and end view, respectively. Fig. 4 is an elevation of the block instrument with the front plate of the casing removed. Fig. 5 is a horizontal section through the said block instrument. Fig. 6 shows the same instrument, on a smaller scale, in front elevation. Fig. 7 is a connection diagram for a single block instrument in the case of a double-track installation. Fig. 8 shows a station instrument arranged to operate the home signal independently, together with a controlling device for indicating the position of the signal or of the points, the front plate of the casing being removed. Fig. 9 shows the same instrument, on a smaller scale, in front elevation. Fig. 10 is a vertical cross-section through the said instrument, and Fig. 11 shows a connection diagram for the same. The three views, Figs. 12, 12$^a$, and 12$^b$, respectively, show connection diagrams for each of three successive sections of a complete double-track installation. Figs. 13 and 14 are diagrammatic views exhibiting the connection between the trolley-pole, locomotive, and starting-lever. Fig. 15 is a sectional view showing the construction of certain parts of the apparatus not clearly exhibited in the other figures. Figs. 16, 17, and 18 are diagrams tracing certain of the circuits. Fig. 19 is a detail view in plan, showing the manner in which the switch-point is operated.

The working current is preferably supplied by a storage battery. The said current, however, can be supplied by a feed-wire from which the instruments of the various sections of the line take the current they require for operating their signals, the earth being utilized as a return. Preferably each section can be provided with a portable storage battery, in which case the above-mentioned feed-wire becomes unnecessary. The charging of these batteries is effected in the well-known manner, preferably from a movable charging-station. In the installation illustrated in Figs. 12 to 12$^b$, which for the sake of simplicity contains only three signal-stations, P' P$^2$ P$^3$, the latter arrangement of storage batteries $a'$ $a^2$ $a^3$ has been selected and the feed-wire $a^x$, which it would be necessary to provide if storage batteries were not used for each separate section, is indicated by a chain-line. The blocking of the section already entered upon by the train and the freeing of the preceding section is effected by the train, but without employing the rail and wheel contacts or insulated rails, &c., hitherto used, which parts are replaced by short lengths of locally-arranged overhead line O, Fig. 7, one piece being placed in each section, receiving current from the corresponding storage battery $a$ by means of a wire $o$ passing through the corresponding block instrument. This current from the overhead line O is taken off by the contact $b$, Fig. 13, arranged on the roof of the cab, and is returned to the battery through the locomotive-wheels, the portion of the track situated under the overhead-line portion, and then through the earth. The contact, which may in the usual way comprise a spring-arm capable of being laid down with yoke or rollers, is connected directly to the starting-lever of the locomotive without any separate handle in such way as to come into the operative position whenever the starting-lever is placed into position for traveling, so that in this way the greatest guarantee is afforded for the correct working of the contact, as there is no possibility of the driver forgetting to bring it into operative position. The height of the overhead line is made as small as possible consistent with the carriage-gage for the given line, so as to render the contact-arm as short as possible. The construction of the said pieces of overhead line is very much the same as that usual in electric tramways. In order to avoid shock when the arm is coming on the overhead line, it is provided at both ends with inclined planes. The length of these overhead lines depends on the speed of the fastest express passing over this section, so as to obtain sufficient duration of contact for operating the apparatus. The separate lengths of rail forming the track under the overhead line are connected by copper strips for the sake of better conductivity, similar to the "bonds" used in tramways. I have decided to employ an overhead line, because by the use thereof neither railway-carriages nor trolleys, but only trains, can have any influence on the block instruments and signals. Besides, apparatus arranged on the track would be frequently damaged during the work which is so often in progress on lines carrying heavy traffic, thus disturbing the whole system, while with the overhead system such work is not interfered with and the current-conveying devices are not disturbed. The working of signals or switch-points is effected by means of an electromotor, which can be a continuous-current motor of any desired type, the only difference from the ordinary electromotors being the construction of its armature-spindle.

Figs. 1, 2, and 3 show a bipolar continuous-current series-wound motor M of the well-known type provided with a ring-armature R of the usual kind, as well as with carbon brushes $c$, which are adjustable, so as to admit of the motor being reversed. The armature-spindle $d$ is hollow and has at the middle a screw-threaded portion into which is screwed a screw-spindle $e$. The screw-thread is of the smallest pitch possible in order to prevent the spindle $e$ from moving too fast in the longitudinal direction when the armature-spindle is rotating. The screw-threaded spindle is provided at both ends with extensions $e'$ and $e^2$ of rectangular cross-section, which pass through correspondingly-shaped openings formed in the bearings $e^3$, situated in the side walls of the motor, which support the journals of the hollow spindle $d$. The two extensions $e'$ and $e^2$ guide the screw-threaded spindle $e$ and at the same time prevent it from rotating. The guide-rod $e'$ is provided at its outer extremity with a pin $f$ in engagement with a longitudinal slot in a lever $g$, keyed on a shaft G. The shaft G is rotatably supported by brackets $g'$, Fig. 3, secured to or cast integerally with the casing, and the said shaft is connected by any convenient system of levers and rods with the signal (semaphore) S, Fig. 7, or with the switch-points. When the armature R of the motor M is caused to rotate by the passage of an electrical current, the spindle $e$, being prevented from rotating, will be forced to move in a longitudinal direction, so that the pin $f$ will cause the rotation of the shaft G, and thereby alter the position of the signal or of the switch-points. The shaft G can in the present case be moved through any desired angle up to ninety degrees. The motor-armature R can, however, be provided with a solid rotating spindle, in which case the lever $g$ is replaced by a worm-wheel fast on the shaft G and in gear with a worm keyed on the armature-spindle, which then is not movable in the longitudinal direction. The shaft can then be turned through any desired angle. In working semaphores, signal-arms, and switch-points it is necessary that the motor should stop in the end positions and at the same time be ready for return movement—that is to say, the current entering next should cause it to rotate in the opposite direction. This is attained by means of the following two circuit-switching devices. To the arm or bracket $h'$, projecting from the motor-casing H, is attached a disk $h$, made of "stabilit" or some other insulating material, through a central opening in which a stabilit sleeve $h^2$, keyed to the spindle G, passes freely. On the opposite flat surfaces of the disk $h$ concentric contacts $i$ $i'$ and $j$ $j$ are secured. The two upper contacts $i$ $i'$ are separated from each other by the stabilit disk $h$, while the lower contacts $j$ $j$ are in permanent electrical connection with each other by means of a pin passing through the stabilit disk. On the stabilit sleeve $h^2$ on each side of the disk $h$ is keyed a double-armed switch $k$ $k'$, which when the sleeve $h^2$, secured to the spindle G, rotates slides on the contacts $i$ $i'$, $j$ $j$. The lower contacts $j$ $j$ are of such a length that the lower arm of each switch always remains in contact therewith whatever their position, while the upper contacts $i$ $i'$ are displaced relatively to each other to an extent exceeding the width of the switch-arm, so that at both end positions of the switch only one contact ($i$ or $i'$) is electrically connected to the contacts $j$. The described arrangement constitutes the switching device which switches out the motor at the end of its course. The second switching device, which can be operated either from the oscillating shaft G or, as shown in the drawings, from the back guide-rod $e^2$ of the screw-threaded spindle $e$, forms a reversing-switch constituted by two pairs of diagonally-connected "scissors-contacts" 10, 11, 12, and 13, Figs. 1, 2, 7, 12, 12$^a$, and 12$^b$. For each pair of opposite non-connected contacts—such as, for instance, 11 13 or 10 12 in Fig. 7—there is provided one switch-lever, keyed onto a rotating spindle 14, Figs. 1 and 2, which carries two such contact-blades 15 and 16, arranged at an angle. The said contact-blades, of which only one, with the corresponding pair of contacts 11 13, is shown in Fig. 2, are insulated from each other, but move simultaneously and in the same direction, so that when the blade 16 contacts with 12 the corresponding blade 16 of the other switch-lever contacts with 13; but when these contacts are broken the blades 15 and 15' contact, respectively, with 10 and 11. To the spindle 14 is secured an arm 17, connected by means of a helical spring 18 with an arm 19, loose on the spindle 14. The arm 19 is provided at its free extremity with a cross-piece 20, projecting into the path of two tappets 21 and 22 on the guide-rod $e^2$.

The connections of the motor M, storage battery $a$, and the two above-described switching devices will now be given with reference to Fig. 7, so as to facilitate understanding the operation of the said switching devices. The storage battery $a$ is connected through a block instrument I, Figs. 4 and 5, hereinafter described, which controls the distribution of the current by means of two wires I and II, Figs. 7 and 12, in parallel, and a joint return III with the electromotor M, the two wires I and II being connected to the corresponding contacts $i$ and $i'$ of the stabilit disk $h$, the return III being in series with the field-magnet winding F of the electromotor M, which winding F is in its turn connected to a binding-screw 24, permanently connected to one of the contact-blades 15 16. The second binding-screw 25, connected to the other contact-blades, 15' 16', is connected with the bottom contacts $j$ of the stabilit disk $h$. As already stated, the scissors-contacts are connected diagonally—that is to say, 10 is connected with 13 and 11 with 12—as may be seen in Fig. 7. In the end position of the motor (indicated in Fig. 1) the signal is at "line blocked" and the two switching devices are in the position indicated in the connection diagram on the right-hand side of Fig. 7, the contacts $i$ and $j$ are in circuit through the switch $k$, while contact between $i'$ and $k'$ (or $j$) is broken. The next passage of current caused by a train passing under the corresponding overhead line, which must put the signal at "all clear," can take place only through the wire I in circuit with $i$, contact being made through the switch $k$ with $j$, which is connected up with the motor while the wire II is interrupted between $i'$ and $k'$. The current goes, therefore, from $a$ (through the said block instrument) through I to $i$ $k$ $j$, terminal 25, contact-blade 16', contact 13, contact 10, motor-armature R, contact 11, contact 12, contact-blade 16, terminal 24, through the field-magnet winding F and wire III back to the battery $a$. The armature R is thereby rotated, causing the screw-spindle $e$ to move to the left-hand side, Fig. 1, whereupon the lever $g$ will cause the spindle G to oscillate in a contra-clockwise direction. This will also cause the switch-arms $k$ $k'$ to move. The switch-arm $k$, conveying the current, will therefore leave the contact $i$ when the motor reaches the end of its stroke, while the switch $k'$ makes contact with $i'$. The motor then ceases to rotate. Meanwhile the following will have happened on the other side of the motor: During the movement of the screw-threaded spindle $e$ to the left the projection or tappet 21 strikes the cross-piece 20 and carries with it the arm 19, loose on the spindle 14, without moving the contact-blades 15 16 and 15' 16'. Then the spring 18 will be stretched until the arm 19 comes into line with the arm 17, mounted on the spindle 14, as shown by chain-lines in Fig. 1. As soon as the arm 19 passes beyond that position the spring 18 causes the contact-blades to move into the opposite position in which the blades 15 15' make contact at 10 and 11. If it is desired to bring the signal S back to the position "line blocked," this can only be effected through the wire II, as according to the foregoing this wire is in circuit through the switch $k'$. The current goes then from $a$ through II to $i''$ $k'$ $j$, terminal 25, blade 15', contact 11, motor-armature R, contact 10, blade 15, terminal 24, through the field-magnet winding F and wire III back to the source of current. As the current passes through the armature in the opposite direction the armature will rotate in a direction opposite to that of its former rotation and cause the screw-threaded spindle $e$ to move to the right, whereupon the switch $k'$ leaves the contact $i''$, the switch $k$ again makes circuit through the contact $i$, and the tappet 22 returns the blades of the reversing-switch into their original position, so that the motor when stopped is ready to start again in the opposite direction. In order to prevent the motor from passing beyond the end positions, the rods operating the signals or the points are provided with glycerin-brakes or dash-pots of the well-known kind or the motors are brought to a standstill in the well-known manner by the use of an electric short-circuiting device.

In motors used for working points the tension-rod connecting the motor and the pointed rail is provided with safety-bolts as used in all centrally-controlled points in case the points spring or jam.

The signal-motors are set in operation on the passage of the train by a circuit-changing or block instrument, such as is illustrated in Figs. 4 and 5. This instrument is arranged in a casing L and essentially comprises an electromagnet $l$, the armature $l'$ of which is mounted on a lever $m$, pivoted at $m'$ and provided with a spring-contact $m^2$. When no current is passing through the electromagnet, the spring-contact is pressed against a contact-screw $u$ in a bracket $u'$ under the action of a helical spring $n$, acting on the lever $m$. At the top of the lever $m$ is arranged a spring-pawl $p$, engaging with a ratchet-wheel $r$, keyed onto a spindle $q$. On the latter spindle are mounted contact-blades 26 and 27 27', which are insulated from one another and from the spindle $q$ by means of sleeves 28, but rotate together with the said spindle $q$, as shown in Fig. 15. On each of the two insulating-sleeves 28 is mounted a brass ring $s$, ($s'$,) to which are secured two diametrically opposite insulating-fingers $t$, ($t'$.) At both sides of the brass rings are arranged spring-contacts 29 30 and 31 32, and arranged opposite to the blades 26 27 27' are fixed contact-strips 33 33', 34 34', and 35 35', with which the said blades make contact. These blades are so arranged relatively to the insulating-fingers that when the blade 26 makes contact with the strips 33 33' the corresponding spring-contacts 29 30 are resting against the corresponding insulating-fingers $t$, while the blades 27 27' are out of contact with the strips 34 34' and 35 35', and the spring-contacts 31 32 rest against the corresponding brass rings $s'$, and vice versa. (See Fig. 5.) On the spindle $q$ is mounted a disk 36, provided with two red and two green circles analogously to the signal positions, one of these circles appearing in each opening 37 of the front plate of the casing, Fig. 6, and indicating the position of the corresponding signal. The parts above mentioned are mounted on a support 38, which can be easily introduced into the casing L between guide-ribs 39. The casing L contains two such apparatus when my improved system is to be used for a double-track line. The space in the casing below the said switching apparatus is used for receiving the terminal or switch boards 40 for connecting the wires to the said instrument. Above the casing L are arranged the required alarms $w$, Fig. 12, fuses, and lightning conductors of the well-known kind. The said switchboards are indicated in Figs. 12, 12$^a$, and 12$^b$ simply by the terminals 1 to 9, all the other auxiliary terminals or binding-screws which are shown in Fig. 4 being left out. As will be seen from these figures, the contact-strip 33 is connected by a wire 42 to the binding-screw 3, connected to the wire I, and the strip 34 is connected by the wire 43 and the terminal 2 with the wire II, and the strip 35 is connected by means of the wire 44 and terminal 7 and 6 with the return-wire III. The strips 33' and 34' are connected in parallel by the wire 45 with the terminal 5, which is connected by means of the wire 46 with the source of the current $a$. The contact-strip 35' is connected to the terminal 8, which is connected through a wire 47 with the terminal 1 of a similar block instrument of the preceding section. The spring-contact 29 is connected to the terminal 1. The spring-contact 31 passes to the terminal 9 and is connected by means of the wire $o$ to the overhead line O, while the spring-contacts 30 and 32 are connected with the armature-lever $m$ by means of a wire 48 through the alarm $w'$ $w^2$ and the electromagnet-windings $l$, thereafter passing through the contact-screw $u$ to the wire 45, leading to the terminal 5, or directly to that terminal. The terminal 4 is connected on the one side with the return-wire III and on the other side with the source of current $a$ by means of a wire 49.

The manner of working of the block instrument will now be described. As the wires I II III are connected to the corresponding strips 33, 34, and 35, the signal-motor receives current through the proper wires, (I III or II III,) and thus rotates in the proper direction when the switching device of the block instrument has been operated. When current is caused to pass through the electromagnet $l$, the latter attracts its armature $l'$, which by means of the pawl $p$ causes the ratchet-wheel $r$, and consequently also the spindle $q$, carrying the contact-blades 26 27 27', to rotate through a certain angle. When the armature is attracted, the contact at the screw $u$ is broken, so that the current is interrupted and the electromagnet receives no more current, whereupon the spring $n$ draws the armature away and again closes the contact at $u$. The armature thus keeps oscillating as long as there is current, so that the blades (26 and 27 27') in contact with the strips are moved out of contact therewith, or if the said blades are out of contact with the strips the blades are moved to make contact therewith. The stopping of the spindle $q$ at the proper moment is effected by the insulating-fingers $t$ $t'$ on the brass rings $s$ $s'$, which lift the spring-contacts 29 30 or 31 32 off the conducting brass rings at the moment when the corresponding blade or blades make contact, and thus interrupt the circuit through the electromagnet $l$. The use of an automatic circuit-breaking device in this block instrument is advantageous in that the atmospheric discharges exercise no influence on the block instrument, as a single attraction of the armature $l'$ cannot effect the switching in or out of the contact-blades 26 27 27'.

The manner of operating the whole system on a double-track line will be now fully described with reference to Figs. 12, $12^a$, and $12^b$. The stations or posts P' and P³ in these figures will be assumed to indicate departure and arrival stations between which there is only one signal station or post P². The parts in these figures are marked in the same way as in the other figures. B' B² are the successive block instruments, of which there are two in each post, one for each direction of traveling. O' O² O³, &c., are the overhead lines; S' S² S³, the semaphore-signals; $o'$ $o^2$ $o^3$, the wires leading to the overhead lines; $a'$ $a^2$ $a^3$, the sources of current; M' M² M³, the electromotors; F' F² F³, the motor-windings; R' R² R³, the motor-armatures, and Z' Z² are the trains. Each track is indicated by a single line. At the stations with reference to the signal-releasing apparatus no attention has been paid to the central controlling of the points, as this case will be dealt with later on. When the section belonging to the post P² is entered upon, the signal S³ is still at "all clear." As soon as the contact-arm $b$ reaches the overhead line O³ the following circuit is established: from the storage battery $a^2$ to the terminal 4 of the instrument B³, terminal 6 through earth, train Z' to $b$ and O³, $o^3$ to terminal 9 of the instrument B³, then through the spring-contact 31 32, alarm $w^3$, electromagnet $l$, armature-lever $m$ to the terminal 5 and back to the battery $a^2$ in the station or post P². This will result in the spindle $q$ of the block instrument B³ being caused to turn, whereupon circuit will be broken at the contact-strips 33 33' and contacts made at 34 34' and 35 35'. The motor-circuit is now closed. Current from the storage battery $a^2$ passes to the terminal 4, (instrument B³,) wire III to the field-magnet winding F³, terminal 24, contact-blade 15, terminal 10, armature R³, binding-screw 11, contact-blade 15', binding-screw 25, through $j$ $k'$ $i'$, wire II to binding-screw 2 in the instrument B³, wire 43, strips 34 34', wire 45, binding-screw 5 back to $a^2$. At the same time the following circuit will be closed for the battery $a'$, situated in the station or post P'. When the spindle $q$ in the instrument B³ turns, it also closes contact at 35 35'. A current flows, therefore, from the battery $a'$ of the station P' to the binding-screw 4 of the instrument B' and passes to the binding-screw 6 of the same instrument, then through earth to the binding-screw 6 (or 7) of the instrument B³ and wire 44 to 35, through blade 27' to 35', to binding-screw 8, (in B³,) and through the wire 47 to the binding-screw 1 of the block instrument B', through spring-contact 29 and ring $s$ to the spring-contact 30, wire 48, alarm $w'$, magnet-winding $l$, armature lever $m$, binding-screw 5, wire 46 back to the battery $a'$ of the post P'. The three figures 12, $12^a$, and $12^b$ belong together, as set forth in the specification, and compose when they are connected according to the lines separated at the ends by dots a continuous properly-associated switch arrangement, from which it is to be noted that the conductor 47 leads from the terminal 8 of a line-block to a terminal 1 of a previous block. Now as the block apparatus for one track of the line is indicated by B', B³, and B⁵ and the block apparatus of the other track of the line by B², B⁴, and B⁶ it is clear that the conductor leads from 8 in B³ to 1 in B'. In this way the switching device of the block instrument B' is operated, whereupon the contacts at 34 34' 35 35' and 29 30 are broken and contact closed at 31 32 and 33 33'. In consequence of the closing of contact at 33 33' the current passes into the motor of the signal S', which up to that time was at "line blocked" and disengages it. A change of position can, however, be effected only after the signal S³ has been put at "line blocked," as in accordance with the foregoing description the necessary connections and reversal of the motor can be effected only when the latter signal is at "line blocked." The current actuating the signal S' comes from $a'$ of the post P' and goes to the binding-screw 4 of the instrument B' through the wire III to the field-magnet winding F', binding-screw 24, contact-blade 16, binding-screw 12, binding-screw 11, motor-armature R', binding-screws 10 and 13, contact-blade 16', binding-screw 25 to $j$ $k$ $i$, wire I, binding-screw 3 of the instrument B', wire 42, contact-strips 33 33', wire 45 to binding-screw 5 and wire 46 back to the battery $a'$. The motor then puts the signal S' at "all clear," so that the semaphore is returned to and remains in its original position until the passing of the next train puts the signal again at "line blocked."

If storage batteries are provided at the end stations (P' P³) only, while the posts or intermediate stations (P²) receive their current through the before-mentioned wire $a^\times$, (indicated by chain-lines in Figs. 12, 12$^a$, 12$^b$,) then the wires 49 on these sections become superfluous, the wire 46 being connected to the wire from the source of current. A purely and exclusively automatic series of operations take place on open line between the end stations. On entering a section it can, however, happen that owing to shunting operations the track is not immediately freed, in which case the home signal should not be put at "all clear." To keep the signal at "line blocked," there is a separate apparatus which can be operated by an official in charge, the said apparatus preferably being arranged in the traffic office or a suitable signal-cabin. In stations with centrally-controlled points or other blocking systems this apparatus can be connected with my improved system of signals either mechanically or electrically. The latter case is illustrated in the connection diagram in Figs. 12, 12$^a$, and 12$^b$. The construction of this apparatus is shown in Figs. 8 to 10. The apparatus in question comprises a hand-operated reversing-switch, beneath which is mounted a device for indicating the position of the home signal by means of colored (red and green) disks appearing at a window in the apparatus. In case of double-track installations two of the hereinafter-described apparatus are arranged in the casing V. On a plate 50, made of insulating material, are arranged two curved contact-pieces 51 52, provided with binding-screws. The plate 50 is secured to the back wall of the casing V and is provided with suitable holes to receive the projecting ends of the core 53 of an electromagnet $v$. Between the two spools of the electromagnet is arranged a spindle 54, on which are mounted contact-arms 55, insulated from the spindle by a sleeve. In the normal position of the spindle 54 these contact-arms do not touch the contacts 51 and 52; but when the spindle is turned in a contra-clockwise direction, Fig. 8, the arm 55 electrically connects these two contacts. The lever 56, carrying the contact-arm 55, is provided with a lateral projection 57, and the said lever is connected to the plate 50 by means of a spring 58. On the spindle 54 is slidably mounted an armature 59 for the electromagnet, a helical spring 60, surrounding said spindle, normally holding said armature away from the core of the magnet while no current is passing through the magnet. Brass bolts are arranged to pass through the said armature freely, but so as to restrain it from turning. A spring-hook 61 is laterally secured to the armature and arranged to engage with the projection 57 when the switch or spindle 54 is turned, whereby the switch is held in the closed position. The end of the spindle 54 projecting beyond the casing is provided with a suitable handle or crank $x$, by means of which the spindle can be turned. The controlling device in the casing V beneath the reversing-switch comprises two electromagnets 62 63, between the cores of which an armature 65, mounted on the spindle 64, can oscillate. On the spindle 64 there is also secured a disk 66, provided with two flat portions 67. In the two end positions of the armature a steel spring 68 rests against one or other of these flat portions and prevents the armature from falling back when the current passing through the electromagnet 62 63 is cut off. Near its lower end the armature is provided with two fingers 69, which cause the lever 71, pivoted at 70, to oscillate in unison with the armature. To the upper end of the said lever 71 are secured the signal-disks 72 (red) and 73, (green,) one or the other of which appears in the window 74 in the front plate of the casing, according to the position of the armature. Beneath this device is arranged the switchboard 75, with the binding-screws required for connecting the wires. One electromagnet, 62, of the control device is, as may be seen from the connection diagram in Fig. 11, connected in series with the winding of the electromagnet $v$ and with the wires I' and III', leading to the corresponding wires I and III, the other electromagnet, 63, being intercalated between the wire II', leading to II, and the wire III', leading to III. The switch 51 52 55 is replaced in the connection diagram in Figs. 12 to 12$^b$ by a simple key 55 and a contact 51, connected to earth. Key 55 is connected by the wire $y$ to the binding-screw 1 of the block instrument B² or B⁵ in the station P' or P³. The working of the switch for operating the home signal is hereinafter more fully described. If the home signal is to be placed at "all clear," then the switch is turned toward the left by means of the handle $x$, Fig. 8. This causes the projection 57 to come under the hook 61, whereby the arm 55 is held in the closed position. The helical spring 58 is then in a state of tension. When contact is made between 51 55, (connection diagram, Fig. 12$^b$,) current from the battery $a^3$ passes through the binding-screw 4 of the instrument B⁵ and binding-screw 6 to earth, through earth to contact 51, through 55 and wire $y$ to the binding-screw 1 of the instrument B⁵, through spring-contacts 29 and 30, alarm $w^5$, into magnet-winding $l$, armature-lever $m$, wire 45, binding-screw 5 of the instrument B⁵ and through 46 back to $a^3$. The reversing-switch of the instrument B⁵ is thereby operated and closes contact at 33 33' in the instrument B⁵, whereby in accordance with the foregoing description current is supplied to the motor M⁵ of the home signal S⁵. The latter is then placed at "all clear." The current to the motor passes through the wire I', the electromagnet 62 or the electromagnet 63 of the controlling apparatus, and the releasing-electromagnet $v$ of the above-described releasing apparatus. Manifestly the current flows either through I' or II', as both of these conductors are continuations of I or II. In the first case the course of the current is shown diagrammatically in Fig. 16, and in the second case the course of the current is shown diagrammatically in Fig. 17. As in one case 62 is traversed by the current and in the other case 63 is traversed by the current, the armature 65 will be driven either in the one or the other direction, as clearly shown in Fig. 18. If 51 be closed, either 62 or 63 will be energized as soon as the conductor I (I') or II (II') is traversed by the current, which in both cases returns through III and indicates the position of the signal operated through the motor. If 51 be disconnected, the motor-circuit I III or II III will be broken off and the signal 72 or 73 will remain in position, being held fast by the flat portion 67 of the armature-spindle 64, and indicates the position of the signal. The electromagnet $v$ automatically breaks contact 51 55 by lifting the spring 61 off the projection 57 of the lever 56, and the latter is rotated to the inoperative position by the spring 58. When the motor stops and there is consequently no current passing in the wire I', the before-mentioned spring 68 prevents the armature 65 from falling back. Since, also, the armature 59 has been lifted off the electromagnet 53 of the electromagnet $v$ by the spring 60, the apparatus is again in the starting position. When the arriving train automatically places the signal at "line blocked" by means of the overhead line and in the manner described, the current also passes through the wire II' and through the electromagnet 63 of the control apparatus connected with it. The energized core of that electromagnet attracts the armature 65 with sufficient force to overcome the pressure exercised by the spring 68 of the disk 66 on the flattened portions 67 being overcome and the red disk 72 appearing in the window 74. The arriving train simultaneously places the signal $S^3$ of the station $P^2$ at "all clear" in the above-described manner, so that the following train is free to proceed. The interruption of the contacts 51 55 taking place immediately after the home signal has been placed at "line blocked" is absolutely necessary, since if said contact remain closed the home signal $S^5$ would change from the "line blocked" position back again to "all clear." In case an official places the home signal at "all clear" in error before the track is free a double key $z$, Fig. 12, can be provided in the station, which may be suitably sealed, connected to the overhead line O through the wire $o$, the corresponding contact being earthed. When the key $z$ is depressed, the corresponding overhead line is earthed. This key therefore in the present instance performs the function of a train.

I claim—

1. An automatic block-signal system embodying short lengths of a locally-arranged overhead line, a contact establishing communication between the line and operated by the starting-lever of the locomotive into and out of operative position, an electromotor arranged at the block and operating signal devices, and means for establishing communication between the line and the electromotor.

2. An automatic block-signal system embodying short lengths of a locally-arranged overhead line, a contact carried by the engine and operated by the starting-lever into and out of operative position, electromotors arranged at the blocks and operating signals, and means for establishing communication with the electromotor and a preceding block.

3. An automatic signal system embodying a lead comprising short lengths of a locally-arranged overhead line, a contact carried by the engine and operated by the starting-lever thereof, electromotors arranged at the blocks and controlling the positions of the signals or of the switch-points of the section in which the train is traveling, means for establishing communication between the line and the electromotor, and means for operating the electromotor of a preceding section, the earth being the return.

4. An automatic block-signal system, a block instrument arranged at stations along the line, signal-motors, the said block instrument and motors being connected by two conductors which alternately convey the current and one common return-lead, the said block instrument being in electrical connection with a similar instrument at a preceding station.

5. An automatic block-signal system, a block instrument arranged at stations along the line, signal-motors, the said block instrument and motors being connected by two conductors which alternately convey the current and one common return-lead, the said block instrument being in electrical connection with a similar instrument at a preceding station, a switching device and an automatic interrupter or circuit-breaker, the switching device, when the movement of the motor is completed operating to break the circuit through which the current is passing at that moment and closes the alternative circuit for operating the motor.

6. An automatic block-signal system, a block instrument arranged at stations along the line, signal-motors, the said block instrument and motors being connected by two conductors which alternately convey the current and one common return-lead, the said block instrument being in electrical connection with a similar instrument at a preceding station, a switching device and an automatic interrupter or circuit-breaker, the switching device, when the movement of the motor is completed, operating to break the circuit through which the current is passing at that moment and closes the alternative circuit for operating the motor, a pair of switching devices operated by the signal-motor, one of which stops the motor after the signal or the switch-points have been placed in position, and the other switching device operating to make the connection required for the reversing motion of the motor, so that the position of the signal or of the points can be changed by the next train through the intermediary of the corresponding block instrument in circuit with the overhead line.

In testimony that I claim the foregoing as my invention I have signed my name in presence of two subscribing witnesses.

ALFRED OESTERREICHER.

Witnesses:
   JOSEF RUBASCH,
   ALVESTO S. HOGUE.